June 6, 1967
H. H. HOLMAN
3,323,508
DISPOSABLE BARBECUE SURFACE
Filed Oct. 5, 1965
3 Sheets-Sheet 1
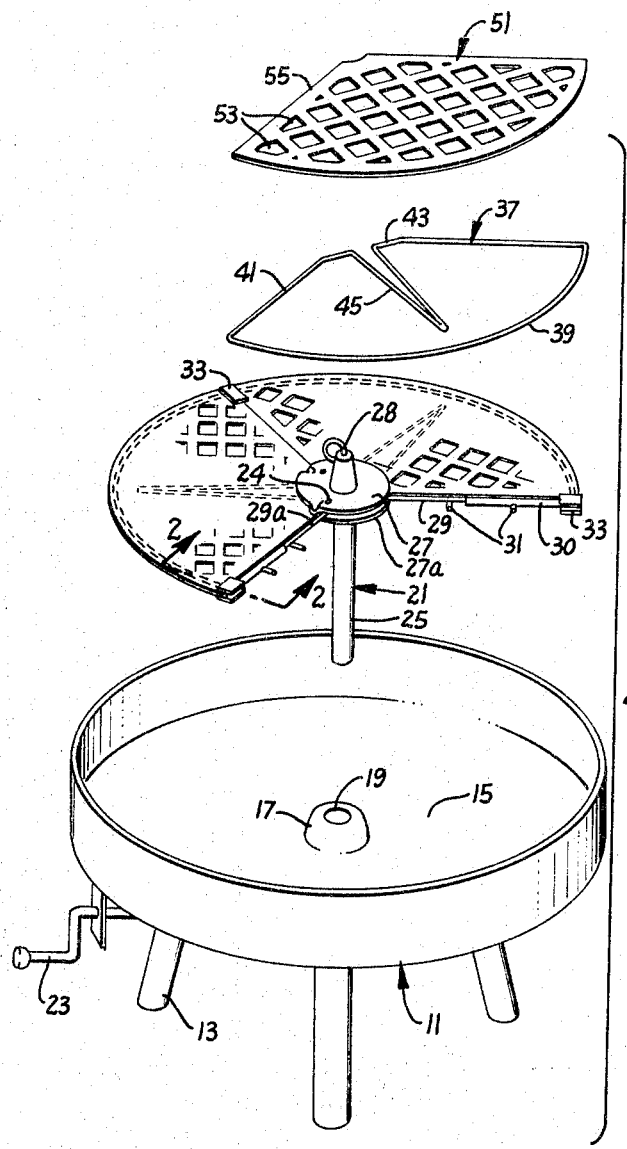
FIG-1.
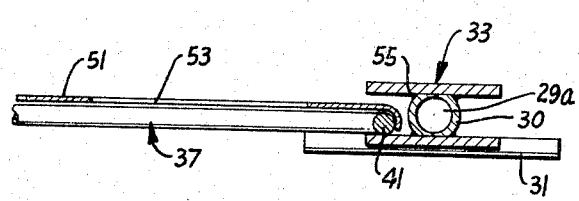
FIG-2.
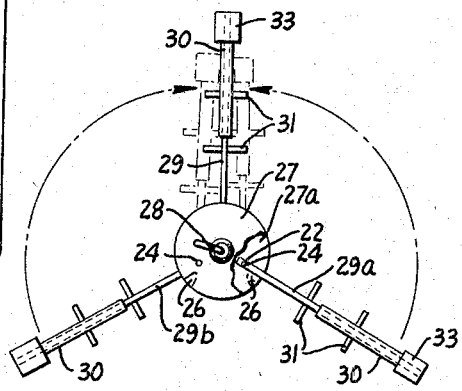
FIG-3.
FIG-4.
FIG-5.
INVENTOR.
HERBERT H. HOLMAN
BY Julian Caplan
ATTORNEY June 6, 1967
H. H. HOLMAN
3,323,508
DISPOSABLE BARBECUE SURFACE
Filed Oct. 5, 1965
3 Sheets-Sheet 2
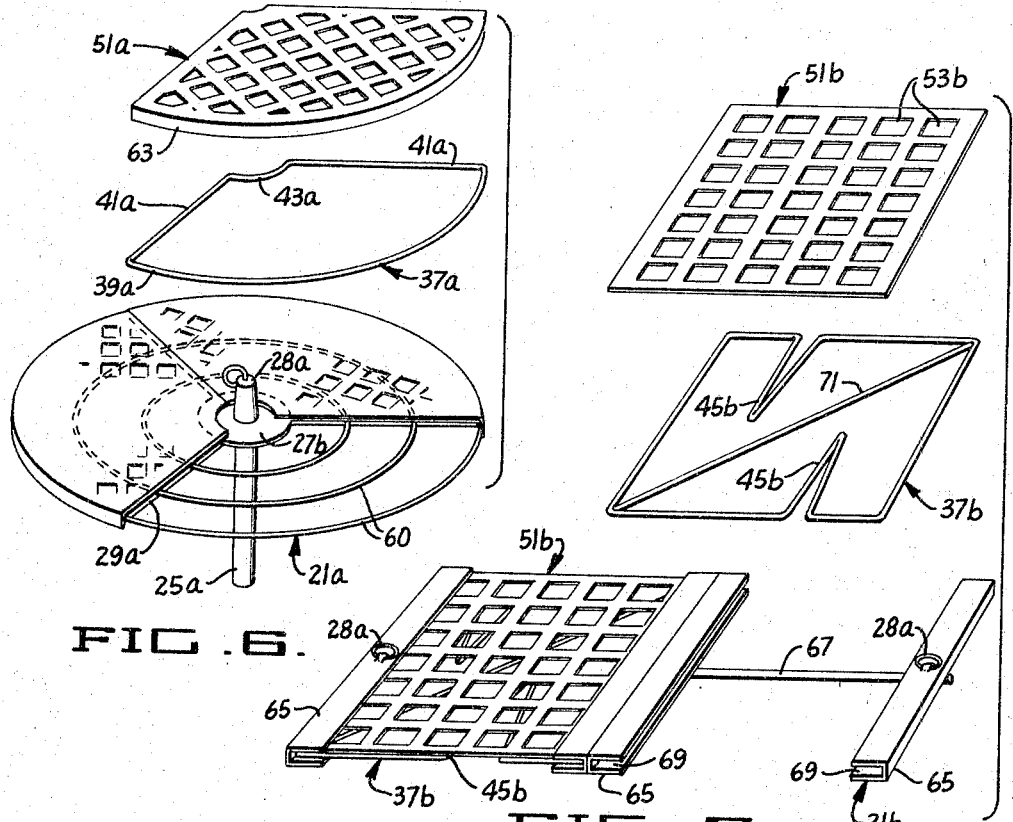
FIG. 6.
FIG. 7.
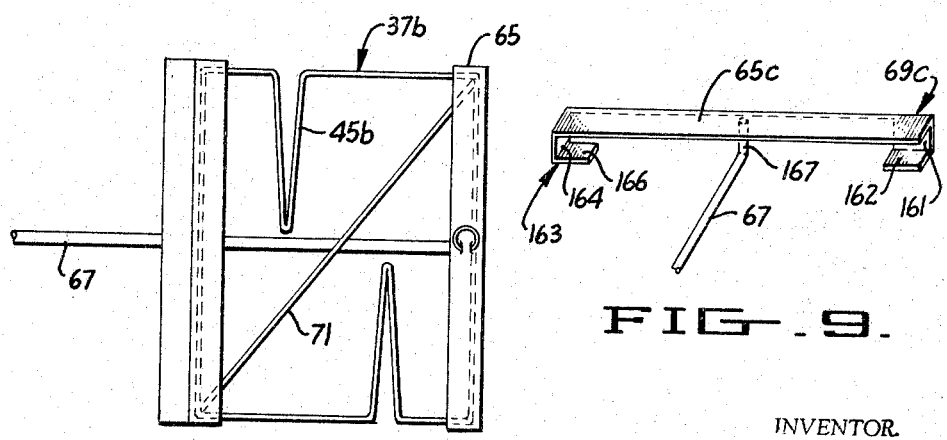
FIG. 8.
FIG. 9.
INVENTOR.
HERBERT H. HOLMAN
BY Julian Caplan
ATTORNEY June 6, 1967

H. H. HOLMAN 3,323,508

DISPOSABLE BARBECUE SURFACE

Filed Oct. 5, 1965

INVENTOR.
HERBERT H. HOLMAN
BY
ATTORNEY

3,323,508
DISPOSABLE BARBECUE SURFACE
Herbert H. Holman, Menlo Park, Calif.
(139 Arch St., Redwood City, Calif. 94062)
Filed Oct. 5, 1965, Ser. No. 493,042
10 Claims. (Cl. 126—25)

This invention relates to a new and improved disposable cooking surface for use with barbecue grills of the type now in common use. Conventional barbecue equipment provides a wire grill suspended over the fire and on which the meat is placed. The present invention replaces such grill.

A primary feature of this invention is the provision of a disposable grilling or cooking surface which is simply installed and removed, inexpensive and eliminates the onerous job of cleaning the greasy and charred permanent wire grill.

Another advantage of this invention is the fact that it may be modified to fit onto any existing barbecue grill pattern or to be used with a supporting structure specifically designed to receive a disposable grill surface. A still further feature of this device is the fact that it may be used with presently existing or specially constructed fire boxes having either a circular or a rectangular grill pattern.

Another advantage of the present invention is that in one form of the invention the disposable cooking surface may be constructed of aluminum foil which is both inexpensive and strong and has excellent heat-conductive properties.

A further feature of one form of the invention is the provision of a supporting wire pattern underlying the disposable foil to afford strength. The supporting wire may be discarded after a number of uses of the grill has rendered the wire surface greasy and charred.

A still further feature of another modified grill surface is the provision of a pattern of sections of expanded metal and holders therefor, which are readily installed and removed and form an adequate cooking support when in use.

Other objects of the present invention will become apparent upon reading the following specification and referring to the accompanying drawings in which similar characters of reference represent corresponding parts in each of the several views.

In the drawings:

FIG. 1 is an exploded perspective view of a barbecue assembly constructed in accordance with the present invention.

FIG. 2 is a partial sectional view taken substantially along line 2—2 of FIG. 1.

FIG. 3 is a plan view of a disposable barbecue surface.

FIG. 4 is a plan view of a supporting wire structure.

FIG. 5 is a plan view of a support assembly having pivoted and collapsible arms.

FIG. 6 is an exploded perspective view of a modification.

FIG. 7 is an exploded perspective view of a rectangular barbecue assembly.

FIG. 8 is a plan view of a rectangular support assembly.

FIG. 9 is a partial perspective view of a modified support structure.

Figure 10:
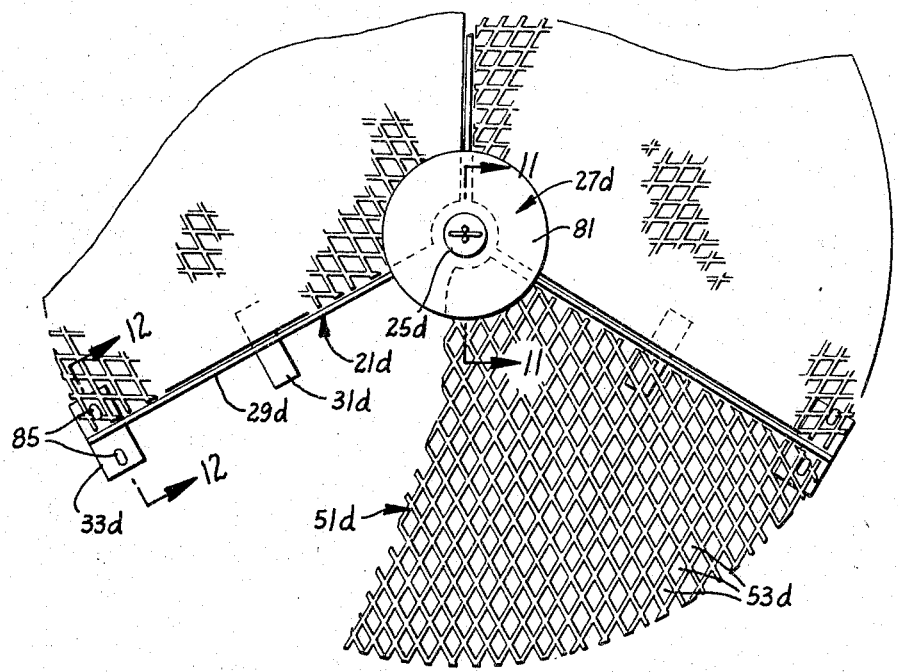
FIG. 10 is an assembled plan view of a modification.

Portable and outdoor barbecues and grills presently enjoy widespread popularity for home use. However, a disadvantage in use is the fact that the grill surface becomes burned, greasy and charred, necessitating a disagreeable cleaning job. The present invention solves this problem by providing an inexpensive disposable grilling surface and supporting means therefor, thereby eliminating the problem of cleaning conventional wire grills.

In the embodiment of FIG. 1, a conventional circularly-shaped fire box 11 is shown supported by legs 13. Formed in upper surface 15 of fire box 11 is boss 17 with receiving aperture 19 formed centrally therein. Aperture 19 rotatably receives main grill support structure 21. Structure 21 is raised and lowered vertically by means of level control assembly 23 as is well understood in this art. Main support assembly 21 is formed of vertically-disposed cylindrical axle 25 which supports at its upper end parallel top and bottom discs 27, 27a and has a lift handle 28. Outwardly radiating arms 29, 29a, 29b here shown spaced approximately 120° apart extend from discs 27, 27a. Rod 29 may be fixed relative to disc 27, 27a. Rods 29a, 29b may be formed with eyes 22 at their inner ends receiving pivot rivets 24 fastened to discs 27, 27a. Hence rods 29a, 29b can pivot to a position parallel and in proximity to rod 29 for transportation and storage. Downturned ears 26 on disc 27 hold rods 29a, 29b in radial position when in erect position. To provide for adjustability for different diameter fire boxes, rods 29, 29a, 29b may be telescopically arranged. Thus the outer portion may be a tube 30 slipping over the ends of the rods. Use of the foldable and telescopic arrangement of rods 29 is optional. Spaced along the length of arms 29 are supporting stubs 31 and attached to the outwardly extending ends of arms 29 are double-channel shape retaining lips 33. Arms 29 and retaining stubs 31 may be formed of round metal stock of heat resistant composition as these parts are intended to be permanent.

Supporting wire structure 37 is formed of heat resistant wire stock formed into a truncated sector shape as shown in FIG. 4. Arcuate peripheral portion 39 joins converging radii 41 which are bent inward to form chordal shoulders 43 directed inward toward the center. Optionally, to provide additional support, outwardly extending V-shaped portion 45 may be attached or integral with shoulders 43. Supporting wire structure 37 is of a size and shape sufficient to permit placement between arms 29, as shown in FIG. 1. Inner shoulder 43 slips between discs 27, 27a while radii 41 rest on a pair of supporting stubs 31, while supporting lips 33 retain the outwardly extending corners 49 of supporting wire structure 37 and prevent upward displacement. Disposable grill surface 51 is formed in a pie-shaped flat wedge and is of a size sufficient to permit installation on supporting wire assembly 37. Formed in disposable grill surface 51 are a plurality of apertures 53, which permit heat and charcoal smoke from the fire in firebox 11 to pass through grill surface 51.

Disposable grill surface 51 is formed of a thickness of aluminum foil or other material sufficient to give it the desired amount of rigidity and strength. However, disposable grill surface 51 is of a material pliable enough so that the outer radial edges 55 may be bent around radial arms 41 and arcuate portion 39 of supporting wire structure 37 as shown in FIG. 2. When so bent disposable grill surface 51 is rigidly affixed to supporting wire assembly 37.

When assembled, disposable grill surface 51 and supporting wire assembly 37 are supported by main support structure 21 and are inserted between the upper and lower portions of retaining lips 33, as shown in FIG. 2. Thus, disposable grill surface 51 forms a strong, clean and sanitary cooking surface which is heated by hot coals placed within firebox 11 and is not likely to be accidentally displaced in use.

After use, supporting wire structure 37 and disposable grill surface 51 are removed as a unit, and grill surface 51 may then be discarded. Supporting wire structure 37 may be marketed as a permanent element or as a disposable or semi-disposable unit, as desired. Upon the next use of grill 11, a new disposable grill surface 51 is placed on supporting wire structure 37, which assembly is thereafter placed on main supporting structure 21, as heretofore described.

A modification is shown in FIG. 6, in which similar elements are designated by the same characters of reference distinguished by the addition of the letter $a$. Main supporting structure 21a, as shown in FIG. 6, is of a conventional type which utilizes a series of concentrically-placed circular wire supports 60 which are affixed at intervals to radial arms 29a. Radial arms 29a are affixed at their inner ends to disc 27b on cylindrical axle portion 25a which fits into aperture 19 of the firebox (not shown). Supporting wire structure 37a is of a more simple construction than that described in the previous embodiment in that it is substantially in the form of a wedge with a flattened or circular central shoulder 43a. Disposable grill surface 51a is similar to that previously described.

It is constructed of a material which may be folded downwardly around its entire periphery in edge 63, as shown in FIG. 6. Edge 63 is folded around supporting wire assembly 37 along its entire length, both along arcuate section 39a, radial sections 41a and central shoulder 43a. Thus, in use, supporting wire structure 37a is entirely covered and protected by shoulder 63 of disposable grill surface 51a. Supporting wire structure 37a is thereby entirely protected from dirt, heat, flames, grease, etc. and may be a permanent part of the grill structure. Note that in this modification only disposable grill surface 51 is disposable in the entire structure, thereby providing a very low cost of operation and replacement.

A modification is shown in FIG. 7 in which corresponding parts are designated by the same reference numerals with the addition of the letter $b$. The grill assembly shown in FIG. 7 is substantially similar to that previously described, with the exception that it is in rectangular rather than circular form. Main supporting structure 21b is formed of a plurality of parallel support channels 65, connected by a horizontal rod 67. Rectangular supporting structure 21b is of a size to be placed horizontally on a rectangular firebox similar in construction to that previously described. It may also be made adjustable by a telescopic construction of parts, as in the preceding modification. Supporting wire structure 37b is generally of a square or rectangular form, with one or more diagonal support rods 71. At the base of each triangular section of supporting wire assembly 37b may be provided inwardly extending V-shaped support formations 45b as additional support for disposable grill surface 51b. Disposable grill surface 51b is similar in construction to that previously described and is shaped to fit around the edges of assembly 37b with a plurality of generally rectangular shaped apertures 53b. Disposable grill surface 51b may be placed flat upon supporting wire assembly 37b, or may be deformed at its edges around the peripheral wires of supporting wire assembly 37, as previously described in the structure of FIG. 6. The assembly of disposable grill surface 51b and supporting wire assembly 37b are then inserted into the openings 69 formed in channels 65 as shown in FIG. 7.

A modification in which corresponding elements are designated by the same reference numerals with the addition of the letter $c$ is shown in FIG. 9. To reduce tendency of grease to collect in channel 65, the support 65c is provided having vertical flange 161 depending from one side edge of support 65c having a lower terminal reversely bent flange 162 parallel to and spaced below bar 65c. At the opposite end is an angle 163 having vertical flange 164 and reversely bent flange 166 below and parallel to bar 65c. The end 167 of rod 67 is bent up and attached to bar 65c as by welding. Wire assembly 37b is supported in a vertical sense by flanges 162 and 166 and bar 67 and flanges 161 and 164 prevent lateral displacement relative to bar 65c.

Figure 11:
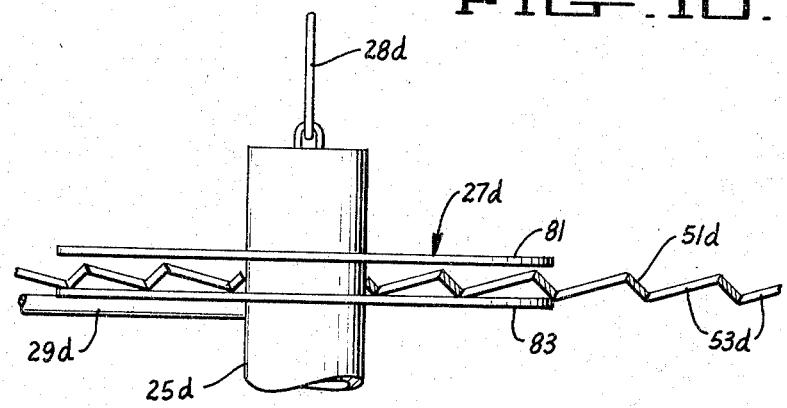
FIG. 11 is a partial sectional view taken substantially along line 11—11 of FIG. 10.
Figure 12:
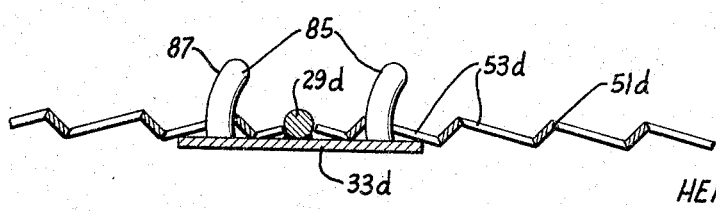
FIG. 12 is a partial sectional view taken substantially along line 12—12 of FIG. 10.

A modification in which similar characters of reference are designated by the addition of the letter $d$ is shown in FIGS. 10, 11 and 12. Main supporting structure 21d is permanently or removably affixed to central axle 25d and is composed of outwardly extending arms 29d to which are affixed support portions 31d and outer retaining portions 33d. Arms 29d may be pivotally connected to hub 27d and arms 29d may be constructed of telescoping portions to present a smaller carrying configuration, as previously described. Central hub 27d is composed of an upper disc 81 and lower disc 83 which are spaced axially apart on axle 25d a distance sufficient to permit the insertion of disposable grill surface 51d. In this modification, grill surface 51d is formed of a commercially available material commonly known as "expanded metal" which is a metal grill formed in a honeycomb pattern with a plurality of apertures 53d. Outer retaining portions 33d each have two upwardly extending retaining posts 85. Disposable grill surface 51d is of a flat wedge shape as previously described, and its inwardly extending apex fits between discs 81 and 83 as shown in FIG. 11, while apertures 53d in its outer arcuate portion fit over retaining posts 85. Posts 85 are slightly bent over to one side at their upper ends 87 to permit easy insertion of grill 51d while restraining grill 51d from moving upwardly or outwardly, as shown in FIG. 12. Support portions 31d further support grill 51d intermediate its inner apex and outer arcuate edge. Grill surface 51d is disposable and inexpensive and enjoys all of the advantages previously described. A lift ring 28d is provided to remove axle 25d from the firebox 11 (not shown).

Although the foregoing invention has been described in some detail, by way of illustration and example for purposes of clarity of understanding, it is understood that certain changes and modifications may be practiced within the spirit of the invention and scope of the appended claims.

What is claimed is:

1. In combination with a barbecue grill firebox, a grill assembly comprising supporting structure means attachable to a grill firebox, said means having narrow, widely spaced support arms, disposable grill cooking surface means held by said supporting structure means, and connecting means detachably holding said disposable surface means on said spaced arms, said support arms extending substantially along two peripheral edges of said disposable surface means, said disposable surface means comprising a substantially flat disposable surface formed with a plurality of apertures therein, said connecting means engaging said peripheral edges.

2. A grill assembly according to claim 1 in which said support arms comprise a plurality of telescoping sections to permit said arms to be telescoped for carrying.

3. A grill assembly according to claim 1 in which said disposable surface is formed of expanded metal.

4. A grill assembly according to claim 1 in which said disposable surface means further comprises wire framework means, said means comprising a metal wire formed into a shape extending along the peripheral edges of said disposable surface.

5. A grill assembly according to claim 4 in which said supporting structure means further comprises a vertically disposed axle mounted in said firebox, a plurality of horizontally extending arms radiating outwardly from said axle, a horizontally disposed disc affixed to said axle, support rods spaced along said arms, said disposable surface attached to said wire framework means, the assembly of said disposable surface and said framework means supported by said arms, said disc and said support rods.

6. A grill assembly according to claim 5 in which said disposable surface and said framework means are of a substantially wedge-shaped configuration.

7. A grill assembly according to claim 4 in which said disposable surface and said framework means are of a substantially rectangular configuration.

8. A grill assembly according to claim 4 in which said connecting means comprises channel shaped clips along said arms, said clips engaging edges of said disposable surface.

9. In combination with a barbecue grill firebox, a grill assembly comprising supporting structure means attachable to a grill firebox, said means having narrow, widely spaced support arms, disposable grill cooking surface means held by said supporting structure means, and connecting means detachably holding said disposable surface means on said spaced support arms, said supporting structure means comprising a central disc, pivot means, pivotally attaching at least some of said arms to said disc, whereby said arms can be folded together for compact storage.

10. In combination with a barbecue grill firebox, a grill assembly comprising supporting structure means attachable to a grill firebox, said means having narrow, widely spaced support arms, disposable grill cooking surface means held by said supporting structure means, connecting means detachably holding said disposable surface means on said spaced support arms, said supporting structure comprising relatively axially slidable rods and tubes for length adjustment to accommodate size variations of fireboxes.

References Cited
UNITED STATES PATENTS

| | | | |
|---|---|---|---|
| 1,530,815 | 3/1925 | Dear | 126—30 X |
| 2,998,002 | 8/1961 | Standig | 126—25 |

FREDERICK L. MATTESON, Jr., *Primary Examiner.*

E. G. FAVORS, *Assistant Examiner.*